(12) United States Patent
Chappell et al.

(10) Patent No.: US 7,717,988 B1
(45) Date of Patent: May 18, 2010

(54) FIRE RESISTIVE COATING

(75) Inventors: Harry H. Chappell, Sparks, NV (US); Darius Chung, Sparks, NV (US); Robert R. Swinney, Reno, NV (US)

(73) Assignee: Versa Terra International, Sparks, NV (US)

( * ) Notice: Subject to any disclaimer, the term of this patent is extended or adjusted under 35 U.S.C. 154(b) by 44 days.

(21) Appl. No.: 11/760,606

(22) Filed: Jun. 8, 2007

(51) Int. Cl.
*C09K 21/02* (2006.01)
*C04B 14/08* (2006.01)
*C04B 14/14* (2006.01)

(52) U.S. Cl. .............. 106/18.12; 106/15.05; 106/18.11; 106/286.5; 106/287.17; 106/483; 106/484; 252/601

(58) Field of Classification Search .............. 106/15.05, 106/18.11, 18.12, 286.5, 287.17, 483, 484; 252/601
See application file for complete search history.

(56) References Cited

U.S. PATENT DOCUMENTS

| 1,317,225 A |   | 9/1919 | Schneider |        |
|-------------|---|--------|-----------|--------|
| 4,101,485 A | * | 7/1978 | Brooks et al. | 524/416 |
| 5,132,030 A | * | 7/1992 | Marx | 252/2 |
| 5,154,235 A | * | 10/1992 | Renaker et al. | 169/46 |
| 5,509,485 A | * | 4/1996 | Almagro | 169/46 |
| 6,676,742 B2 | * | 1/2004 | Gilli | 106/464 |
| 7,087,105 B1 | * | 8/2006 | Chappell et al. | 106/18.12 |
| 7,416,589 B2 | * | 8/2008 | Chappell et al. | 106/18.12 |

FOREIGN PATENT DOCUMENTS

| JP | 2003-238902 A | * | 8/2003 |
| JP | 2003-342530 A | * | 12/2003 |

OTHER PUBLICATIONS

"Watersaver: Specifications of Lassenite Type N", http://www.h2o-savers.com/iframes/spec.html (Sep. 15, 2005).*
"Calcined Pozzolan" (4 pages), http://www.westernpozzolan.com/techLassMSDS.htm (Sep. 15, 2005).*
"Test Report Comparison of Pozzolan "N" vs. Fly Ash Class "F"", http://www.westernpozzolan.com/vsflyash.htm (Sep. 15, 2005).*
"Lassenite-SR Uses and Benefits," Four pages printed from the Western Pozzolan Corp. Internet Website, www.westernpozzolancorp.com/lassBen.htm, on Nov. 18, 2004.*

* cited by examiner

*Primary Examiner*—Anthony J Green
(74) *Attorney, Agent, or Firm*—Lewis and Roca LLP

(57) ABSTRACT

A fire resistive coating made Lassenite N Pozzolan and a water based paint. The Lassenite N Pozzolan is present in a range from about 20% by weight of the composition to about 80% by weight of the composition. The water-based paint present in the range from substantially 20% by weight of the composition to substantially 80% by weight of the composition.

16 Claims, No Drawings

FIRE RESISTIVE COATING

FIELD OF THE INVENTION

The present invention relates to fire-restrictive coatings. More particularly, this invention relates to fire restrictive coatings that include commercially available water-based paints and fire-resistive additive added to the water-based paint. Still more particularly, this invention relates to an adding Lassenite N Pozzolan to a water-based paint to make a composition that is fire-resistive and may be coated on surfaces.

PRIOR ART

For over 60 years, fire-retardant-treated (FRT) plywood and lumber have been used successfully in structures exposed to temperatures up to 100° F. (37° C.). However, thermal degradation occurs in the fire retardant plywood and lumber when the plywood and lumber are exposed to elevated temperatures. When thermal degradation occurs, the chemical components of the wood are Hydrolyzed. The Hydrolyzation of the wood causes a loss of strength in the wood.

Another method of protecting wood is to apply a fire resistive coating to the wood. Fire resistive coatings are potential solutions to other fire safety problems, such as, rehabilitation of existing wood structures to current code requirements. The steel industry improves fire endurance of steel members by directly covering the members with fire-resistive panels or coatings.

Currently, the wood industry uses fire-retardant coatings to reduce the flame spread over a surface. Depending upon the thickness of the coating and durability of the coating under fire exposure, a coating may delay ignition of the wood for a few minutes or may provide an insulative layer that reduces the rate of charring of the covered wood. A variety of fire-resistant or fire-restrictive coatings have been proposed. Presently, coatings are chemical compositions. Commonly the compositions are an intumescent fire-retardant which swells or enlarges to capture water or another fire retardant in the coating. For both fire-retardant or fire-restrictive coatings, the performance of intumescent compositions as a fire-resistant membrane on wood has been evaluated with good results.

However, full-scale testing of wood coated with intumescent compositions has not produced the same results. Instead, the improvements have been less than the improvement obtained in the small-scaled tests. However, the use of intumescent compositions still met fire code standards for wood construction during the full-scale tests for interior surfaces. As of yet, successful exterior use of an intumescent composition has yet to be developed.

The major problem with an exterior combined treatment is that most combinations of fire-resistive intumescent compositions and preservatives are chemically incompatible. This is because most preservatives are oil based and do not adhere to the water-based intumescent compositions. Moreover, most intumescent compositions are susceptible to leaching from moisture when exposed to outdoor conditions. Additionally, many leach-resistant preservatives impart an unacceptable color to the wood.

Those skilled in the art will recognize that a fire-resistant or fire-restrictive coating that is effective for all types of structural members and meets or exceeds current fire code standards irrespective of material to which the coating is applied, whether the material is in interior or on exterior of the structure and the configuration of the material. It would be even further desirable to provide a fire-resistant or fire-restrictive coating that is made of non-hazardous chemicals. Specifically, the coating should not require a mixture of chemicals potentially harmful to personnel and equipment during production or subsequent application. Furthermore, the coating should be harmless to the environment during the drying or curing period. Finally, the coating should not produce noxious gases or chemicals when exposed to the high heat and flames of a fire.

SUMMARY OF THE INVENTION

The above and other problems are solved and an advance in the art is made by a fire-resistive coating in accordance with this invention. A first advantage of a fire-resistive coating in accordance with this invention is that the coating is inexpensive to produce. A second advantage of the coating in accordance with this invention is that the coating is environmentally friendly and non-toxic. Furthermore, a third advantage of the coating in accordance with this invention is that the coating is unaffected by environmental conditions. Thus, may be used for both interior and exterior surfaces. A fourth advantage is that coating is non-toxic when exposed to heat and/or flames of a fire.

In accordance with this invention, a fire-resistant coating composition includes natural Lassenite Pozzolan including class N (natural) and a water-based paint mixed into a slurry. Preferably, the Lassenite Pozzolan is processed into a specified particle size talc-like powdery dry state. The water-based paint may then be any commercially available water based paint.

In accordance with an exemplary embodiment of the invention, the composition is approximately 20% by weight to 80% by weight Lassenite N Pozzolan and approximately 20% by weight to 80% by weight water-based paint. In the another exemplary embodiment, the coating includes Lassenite N Pozzolan is present in a range from approximately 3.3% by weight to 80% by weight, the water-based paint is present in a range from approximately 3.3% by to 80% by weight and water present in the range from approximately 4.8% by to 16.7% by weight. Finally, in a preferred exemplary embodiment, Lassenite N Pozzolan is about 23.5% by weight of the composition, water-based paint is about 70.6% by weight of the composition, and water is present in an amount that is about 5.9% by weight of the composition.

Furthermore, pigmentation may be added to composition to create a specific color. A composition should have consistency that is applied effectively and efficiently on a surface. The composition is accordance with this invention may then be applied to any material including wood and metal by any number of methods including, but not limited to, spraying, rolling, and dipping a piece of material into a tank containing the composition.

These and other features and advantages of the present invention will become readily apparent upon further review of the following Detailed Description.

DETAILED DESCRIPTION

The present invention is a fire-resistive coating that may be applied to materials using well-established methods of applying coatings. For purposes of this discussion, the term "fire-resistive" is used. However, this term may mean fire resistive and fire resistant and a fire-resistant material is a fire-resistive material that meets a higher set of criteria than a fire resistive material. Thus, one skilled in the art will recognize that fire-resistant is merely a sub-group or the more encompassing term fire resistive.

A composition in accordance with this invention may be applied to individual members of a structure regardless of material before during and/or after completion of the structure. For steel or other metallic structures, pre-application of the product may be beneficial because the non-slip characteristics of the composition after curing forms a cement-like barrier. A composition in accordance with this invention is effective in slowing down rising temperatures to primary structures from a heat source and/or flames from fires. Furthermore vapors and chemical caused by exposure of the composition to heat and/or flame are harmless to the environment and surrounding personnel due to the absence of hazardous chemicals within the product.

Lassenite Type N Pozzolan is a natural siliceous (amorphous) mineral, from the layers of diatoms and volcanic tuffs of Northern California's Cascade Range. Lassenite Type N Pozzolan conforms to ASTM C-618, Federal Specifications #SS-C-1960/5 and DSA-CAN-A266-3m (Canadian) specifications for Type N (Natural) Pozzolan. Lassenite Type N Pozzolan also meets specification requirements of the NRC for use on the Nuclear Reactor Program; California Department of Water Resources; Corp. of Engineers; U.S. Water and Power Resources Services; Cal Trans; Pacific Gas & Electric; Idaho Power; and Arizona Public Service for hydraulic structures and power plants; and Bechtel Corporation for hydraulic structures, and municipalities for waste water treatment and transportation facilities.

Most deposits of Lassenite Type N Pozzolan have their origin during a period of intense volcanic activity. Volcanic eruptions sent clouds of volcanic ash into the atmosphere. Prevailing winds carried the ash in an easterly direction, deposited the ash mostly on barren terrain and in warm, fresh and salt water lakes, basins, and various sinks throughout the Western part of the United States. These diatoms have been identified from drilling logs and core samples when the extent of these deposits was first determined. Thousands of years of alternating deposits of the skeletal diatoms and air drop volcanic ash, coupled with similar types of minerals being eroded into rivers and streams were eventually deposited into the mix of skeletal diatoms and volcanic ash on the bottom of shallow lakes and basins.

Among these unique and natural phenomena were three necessary conditions that produce a relatively pure natural (Type N) Pozzolan. These three important environmental conditions are: (1) the yearly average temperature of the lake water must be warm enough to support a continual bloom and demise of the diatoms; (2) the pH of lake water must remain relatively constant, ranging between a pH of 6.0 to 8.0; and (3) the soluble mineral content of the lake water and its composition must remain relatively constant.

If the above conditions are met, the finely divided particles of aluminum silicates that make up the bulk of volcanic ash will tend to combine with and replace the bony skeleton structure of the diatoms with unique, hard, non-crystalline, amorphous silica compound. The pozzolanic property in the final deposit of the silica compounds depends upon the competitive affects due to the concentration of different metallic ions present in the solution matrix of the lakes water and the capability of ions for producing a highly non-crystalline (amorphous) deposit with remarkable chemical and physical uniformity throughout the deposit. The purity and uniformity of the chemical composition of the Lassenite N Pozzolan has been determined and is virtually free of foreign or toxigenic matter. This is demonstrated by its high concentration of amorphous silica and the low concentration of metallic oxides.

Another important property regarding the Lassenite Pozzolan is the ability of amorphous silica to silicify the skeletal structure of the unicellular diatoms, which form, "Kieselguhr," a loose or porous diatomite mineral commonly known as Diatomaceous Earth. The porous property of the diatomite mineral and the small capillaries throughout the mineral provides a capacity for Lassenite Pozzolan to be used as an excellent absorbent. The porous property of the mineral not only has an ability to absorb aqueous solutions and water, but organic solvents and oils as well. The tendency of this mineral to absorb and retain water without leaching has been discovered to be useful as an ingredient in a fire-resistant and/or fire restrictive coatings.

The finely divided particles of dry Lassenite Pozzolan are thoroughly mixed with a measured volume of any "off-the-shelf" water based paint. The resulting mixture forms a slurry-type composition capable of suspending the particles of pozzolan in a mixture having a viscosity sufficient to avoid solids separation. The amorphous silica mineral structure found in the Lassenite Pozzolan is distinct from the non-pozzolan, crystalline structure of the siliceous material found in clay minerals. Crystalline structure siliceous material does not have the water retaining and coating characteristics desirable in a fire-resistant or fire-restrictive coating as discussed below.

A fire-resistant or fire restrictive coating using the pozzolanic slurry has the following attributes: (1) no toxic affect cause by the evaporation or vaporization of the composition to the environment or human personnel throughout the sequence of events from initial production to protection against heat and/or flames; (2) no toxic or hazardous chemical vapors from contact with heat and/or flames, that could produce a hazardous environment for fire-fighting personnel; (3) the amorphous silica slurry has the ability to coat and insulate or isolate any structural member, thus creating valuable time to prevent the member from reaching critical ignition temperatures for wooden structures and/or critical temperatures that would compromise the structural integrity of steel or other metallic structures until the heat source is removed; and (4) the neutral affect of the coating, with a pH of 7, has little or no effect to the environment.

A typical Lassenite type N Pozzolan has a composition having, very conservatively, $SiO_2$ of 70.5% (amorphous), $Fe_2O_3$ of 6.0%, and $Al_2O_3$ of 17.8% for a total oxides number of 94.4%. Other components include CaO of 2.3%, MgO of 0.8%, $SO_3$ of 0.6%, $Na_2O$ and $K_2O$ of 0.2% and having a pH of 6.9. Weight loss on ignition is 0.2%. Physical characteristics include a specific gravity of 2.36 and a bulk density of 38.0 pounds per cubic foot (loose).

The inventive fire-resistant or fire-restrictive coating composition includes substantially two innocuous ingredients which have no harmful effects to the atmosphere, or human life. These ingredients are (1) dry Pozzolanic talc-like powder, either raw or calcined, (2) any "off-the-shelf" water-based paint.

In use, pre-determined amounts of dry Pozzolanic talc-like powder, stored and sealed in five gallon buckets, and transported to the coating manufacturer's site. At the site, based on gallon or 128 oz., the Pozzolanic dry talc-like powder (32 oz.) is mixed with the water-based paint (96 oz.), add 8 oz. of water and mixed into an innocuous slurry to form the desired "Mixture." The composition is filled into any convenient size container, covered, and ready for the ultimate end user designated as a fire-resistant or fire-restrictive coating.

EXAMPLE

A series of tests were done, repeated, and recorded, resulting in an overall "Preferred" volumetric gallon in ounces, thus ratios were determined in ounces of Pozzolan to "off-the-shelf" water-based paint coatings mixed and applied on wooden and steel test specimens. Three ratios were selected and are the following: (1) one to one; (2) one to two; and (3) one to three. A single coat of each ratio was applied to the test specimens and after mixing the following was noted: (i) the ratio of (1) the mixture was very thick but appearance of the texture after curing was acceptable; (ii) the ratio of (2) the mixture still appeared too thick but appearance of the texture after curing was also acceptable; and (iii) the ratio of (3) was less thick, however adding 8 oz. of water, both the mixture and texture after curing looked very acceptable. Application of (3) was also easier and flowed smoothly and evenly. The test provided guidelines and conclusions that irrespective of type and surface condition of a material, the one to three ratio is the "Preferred" and two coats minimum shall be applied to assure one hundred Percent (100%) coverage of a pre-determined area. The option to add more coats will be at the discretion of the end user. The more coats added increases the cost. However, additional coats result in a thicker barrier that increases the fire-resistant or fire-restrictive insulation and/or isolation time from primary structural members until the heat source is removed. The following table lists the various combinations that may be used to make a fire resistive composition in accordance with the present invention.

The above is a description of exemplary embodiments of a fire resistive composition in accordance with this invention. It is expected that those skilled in the art can and will design alternative compositions that infringe on this invention as set forth in the claims below either literally or through the Doctrine of Equivalents.

We claim:

1. A fire-restrictive coating composition, comprising:
    Lassenite N Pozzolan present in a range from substantially 20% by weight of said composition to substantially 80% by weight of said composition; and
    water-based paint present in a range from substantially 20 percent by weight of said composition to substantially 80% by weight of said composition.

2. The fire resistive coating composition of claim 1, wherein said water-based paint is a commercially available water-based paint.

3. The fire resistive coating composition of claim 2 wherein said water based paint includes pigmentation to add a color to said composition.

4. The fire resistive coating composition of claim 1 mixed together in relative amounts to their respective percentages in weight in said composition of said Lassenite N Pozzolan, water based paint, and water forming a slurry having a consistency that is capable of being applied effectively and efficiently on a surface.

5. The fire resistive coating of claim 4 wherein said composition is capable of being applied by spraying.

6. The fire resistive coating of claim 4 wherein said composition is capable of being applied by rolling.

| Ratios | Lassenite (Oz.) | Wt. % | Paint (Oz.) | Wt. % | Water (Oz.) | Wt. % | Wt. (Oz.) per Gal |
|---|---|---|---|---|---|---|---|
| 1 to 4 | 25.6 | 20 | 102.4 | 80 | 6.4 | 4.8 | 134.4 |
| 1 to 3 | 32.0 | 23.5 | 96.0 | 70.6 | <u>8.0</u> | 5.9 | 136.0 |
| 1 to 2 | 42.65 | 33 | 85.35 | 67 | 10.7 | 7.7 | 138.7 |
| 1 to 1 | 64.0 | 50 | 64.0 | 50 | 16.0 | 11.1 | 144.0 |
| 2 to 1 | 85.35 | 67 | 42.65 | 33 | 21.3 | 14.3 | 149.3 |
| 3 to 1 | 96.0 | 70.6 | 32.0 | 25 | 24.0 | 15.8 | 152.0 |
| 4 to 1 | 102.4 | 80 | 25.6 | 20 | 25.6 | 16.7 | 153.6 |

In this situation, the term "Volumetric Measurements in Gallons" is used as a term of art in preparation and application of the coating: (1) spraying, (2) brushing, and/or (3) rolling and by experience appear to be a non-issue. By experience and numerous tests, the ratio of one part Pozzolan to three parts typical water-based paint is the ideal. In every case because of the absorptive capability of Pozzolan, a given number gallons of water-based paint when mixed with the Pozzolan yields an increase in number of gallons of fire-resistant or fire-restrictive coating.

The maximum particle size of the dry Pozzolanic product is −30 mesh to a minimum of 325 mesh. The above tests were repeated multiple times with minor variations in volumetric measurement of the resultant ratios for a given composition. The Pozzolanic Mineral of −30 mesh is presently available as a by-product of present other mineral sizing product requirements and is cheaply attained and readily available.

The water-based paint is any commercially available water based paint. Considerations of the type of water based painted included in the composition may include, but are not limited to cost and availability. Typically, "off the shelf" paints available in any store may be used.

7. The fire resistive coating of claim 4 wherein said composition is capable of being applied by dipping a piece of material into a tank containing said composition.

8. The fire resistive coating composition of claim 4 wherein said composition is capable of being applied to a piece of wood.

9. The fire resistive coating of claim 4 wherein said composition is capable of being applied to a piece of metal.

10. A fire-resistive coating composition comprising:
    Lassenite N Pozzolan present in a range from substantially 3.3% by weight of said composition to substantially 80% by weight of said composition;
    water-based paint present in a range from substantially 3.3% by weight of said composition to substantially 80% by weight of said composition; and
    water present in a range from substantially 4.8% by weight of said composition to 16.7% by weight of said composition.

11. The fire-resistive coating composition of claim 10, wherein said Lassenite N Pozzolan is present in an amount that is substantially 23.5% by weight of said composition, said water-based paint is present in an amount that is substantially 70.6% by weight of said composition, and said water is present in an amount that is substantially 5.9% by weight of said composition.

12. A method for producing a fire-restrictive coating composition, comprising:
   adding Lassenite N Pozzolan to a composition in a range from substantially 20% by weight of said composition to substantially 80% by weight of said composition;
   adding water-based paint to the composition in a range from substantially 20 percent by weight of said composition to substantially 80% by weight of said composition; and
   mixing said composition.

13. The method of claim 12, wherein said water-based paint is a commercially available water-based paint.

14. The method of claim 13 further comprising:
   adding pigmentation to said composition to add a color to said composition; and
   mixing said composition responsive to adding said pigmentation.

15. A method for producing a fire-restrictive coating composition, comprising:
   adding Lassenite N Pozzolan in a range from substantially 3.3% by weight of a composition to substantially 80% by weight of said composition;
   adding said water based paint in a range from substantially 3.3% by weight of said composition to substantially 80% by weight of said composition;
   adding water to said composition in the range from substantially 4.8% by weight of said composition to 16.7% by weight of said composition; and
   mixing said composition responsive to adding said water.

16. The method of claim 15, wherein said Lassenite N Pozzolan is added in an amount that is substantially 23.5% by weight of said composition, said water-based paint is added in an amount that is substantially 70.6% by weight of said composition, and said water is added in an amount that is substantially 5.9% by weight of said composition.

* * * * *